United States Patent [19]

Simeonov et al.

[11] 4,212,681
[45] Jul. 15, 1980

[54] METHOD OF ACCELERATING THE HARDENING AND INCREASING THE STRENGTH OF PORTLAND CEMENT

[75] Inventors: Yordan T. Simeonov; Nikola B. Djabarov, both of Sofia, Bulgaria

[73] Assignee: Centralna Laboratoria Po Physiko-Chimicheska Mechanika pri Ban, Sofia, Bulgaria

[21] Appl. No.: 970,056

[22] Filed: Dec. 14, 1978

Related U.S. Application Data

[63] Continuation of Ser. No. 839,043, Oct. 3, 1977, abandoned.

[51] Int. Cl.$^2$ .................................................. C04B 7/35
[52] U.S. Cl. ........................................ 106/89; 106/315
[58] Field of Search ............................ 106/89, 314, 315

[56] References Cited

U.S. PATENT DOCUMENTS

| | | | |
|---|---|---|---|
| 1,006,725 | 10/1911 | Cramer | 106/89 |
| 1,782,471 | 11/1930 | Kirchner | 106/89 |
| 2,465,278 | 3/1949 | Schenker et al. | 106/314 |
| 3,210,207 | 10/1965 | Dodson et al. | 106/315 |
| 3,329,517 | 7/1967 | Dodson et al. | 106/315 |
| 3,427,175 | 2/1969 | Angstadt et al. | 106/315 |
| 3,649,317 | 3/1972 | Houseknecht | 106/314 |
| 3,782,992 | 1/1974 | Uchikawa et al. | 106/315 |
| 4,019,918 | 4/1977 | Wills | 106/315 |
| 4,076,546 | 2/1978 | Simeonov et al. | 106/89 |
| 4,134,773 | 1/1979 | Simeonov et al. | 106/89 |

*Primary Examiner*—James Poer
*Attorney, Agent, or Firm*—E. Janet Berry; Lawrence Rosen

[57] ABSTRACT

Method for accelerating the hardening and increasing the strength of Portland cement by mixing Portland cement with water and with a mixture containing dialuminum pentahydroxychloride, calcium sulfate and calcium oxide in weight ratios of 1:3.5 to 4.3:1.3 to 1.8, respectively, and up to 2 parts by weight of an alkali metal nitrite at temperatures up to 90° C. and thereafter hardening the mixture at temperatures up to 100° C. The mixing can be carried out either by wet mixing or dry grinding the ingredients.

3 Claims, No Drawings

METHOD OF ACCELERATING THE HARDENING AND INCREASING THE STRENGTH OF PORTLAND CEMENT

This application is a continuation application of copending application Ser. No. 839,043, filed Oct. 3, 1977, entitled "Admixture for Obtaining Rapid-Hardening Portland Cement and a Method by which it is to be Performed", now abandoned.

This invention is related to an admixture for the obtaining of rapid-hardening Portland-type cement and a method by which is to be performed. The invention can be used for the rapid-hardening of cement pastes of cement-sand mortars and concretes, intended either for monolithic or prefabricated constructions.

There is a well-known admixture for the obtainment od rapid-hardening Portland cement. The admixture includes calcium sulphate, or calcium oxide or calcium dichloride. The disadvantage of this admixture is that it does not increase sufficiently the hardness or that its content of chlorine is very high.

The scope of this invention is to annihilate the above-mentioned drawbacks by elaborating an admixture for the obtaining of rapid-hardening Portland cement, as well as a method of its application, wherein the use of the admixture would appear possible for some more specific brands of steel reinforced concrete, thus broadening the application-field of both admixture and method.

This problem is solved with the aid of a freshly-elaborated admixture for the obtainment of rapid-hardening Portland-cement, comprising active bialuminium threeoxide, introduced in the form of bialuminium pentahydrooxichloride, calcium sulphate and calcium oxide at weight-ratios of $Al_2O_3:CaSO_4:CaO = 1:3,5$ to $4,3:1,3$ to $1,8$ where up to 2 weight-parts of nitrite-alkaline or alkaline-earth are also added, which are intended to neutralize the action of chlorine. A method of application of the admixture is also elaborated, wherein 4 to 16 weight parts of $Al_2O_3+ CaSO_4+ CaO$ and up to 2 weight parts of nitride are dryly or by means of the mixing water mixed with 100 parts of portland-cement labelled not less than "350".

The temperature of the concrete mixture can be equal to that of the environment, or risen up to 90° C., but perferably 30° to 50° C. With the so obtained mixture cement-pastes, cement-sand mortars and concretes are prepared, which are thereafter left to harden at a surrounding temperature, or can be submitted to a heat-treatment up to 100° C., but preferably at 50° to 90° C.

The advantage of this invention is, that the new admixture does neutralize the action of chlorine, thus broadening the field of its application also for some particular types of steel reinforced concrete. Further more with the introducing of nitrite, a complementary increase of the portland cement-strength is obtained.

Anather advantage is that the mixing of the cement with the admixture can be realized also dryly, either in the cement plants, or at the same milling of said cement.

Again, another substantial advantage is that by warming up the cement, mortar or concrete mixtures, or by their heat-teatment after the moulding, the acceleration of the hardening is additionally increased, this greatly helding to overcome the environmental influence, and, a considerably accelerated turn over of the moulds can be achieved.

The invention could be better understood by citing the following examples:

EXAMPLE 1

For a batch of 100 weight parts of portland cement 2 weight parts of bialuminium pentahydrooxidechloride and 0,22 weight parts of natrium nitrite are dosed, and dissolved in the mixing water.

To the so obtained solution are succesively added 4 weight parts of semi-hydrate gypsum and 2 weight parts of hydrate lime, wherein the weight-ratios are: $Al_2O_3:CaSO_4:CaO = 1:3, 8,1,6$; then, with the resulting mixture a cement-sand mortar is obtained, featuring a cement-sand ratio of 1:3 at a water/cement ratio of 0,5. With the aid of a jolting apparatus, prismes sized $4 \times 4 \times 16$ cm are prepared, After unmoulding they are in water set at 20° C. until time of testing arrives. For comparison reasons this is related to prisms with or without natrium-nitrate component of the admixture, as well as to such, without any admixture included. The experimental results (see Table 1 had shown that the natrium nitrite component of the admixture not only neutralizes the action of chlorine but also provides an additional strength-increase.

TABLE 1

Compression-strength of a cement-sand 1:3 mortar with water cement ratio of 0,5 with and without inclusion of natrium nitrite into the complex admixture

| Compound | 1 day kg$^f$/cm$^2$ | % | 3 days kg$^f$/cm$^2$ | % | 28 days kg$^f$/cm$^2$ | % |
|---|---|---|---|---|---|---|
| PC$^x$ | | | | | | |
| PC$^x$ with a nitriteless admixture | 73,8 | 100 | — | — | 422,9 | 100 |
| PC | 160,1 | 216,9 | — | — | 466,0 | 110,2 |
| PC including nitrite in the admixture | 83,7 | 100,0 | 213,4 | 100,0 | 417,6 | 100,0 |
| | 183,8 | 219,6 | 330,9 | 155,1 | 478,5 | 114,6 |

Remark: PC$^x$ is for portland cement which has been stored for a longer time before use, compared to PC.

EXAMPLE 2

For a batch of 100 weight parts of portland cement, 2 weight parts of bialuminium pentahydrooxidechloride and 0,22 weight parts of natrium nitride are dosed. Thereupon they are dissolved inthe mixing water. To the resulting solution, 4 weight parts of semi-hydrate gypsum and 2 weight parts of hydrate lime are successively added (weight-ratios: $Al_2O_3:CaSO_4:CaO = 1:3,8:1,6$). With the obtained blend further concrete is prepared with following ratios: cement to aggregates—as 1:4,5 with 410 kg of portland cement per 1 cubic meter and at a water/cement ratio of 0,42. The concrete-mixture materials are preheated, so as after their preparation by means of a compulsory-action concrete-mixer, the temperature of the mixture amounts to 36° C.

At same conditions and composition, concrete mixture is prepared, in the water of which no admixture is included.

The temperature of the concrete-mix at the same preheating conditions reaches 32° C., since without the admixture the hydratation and the exothermy of the cement are going slower.

From both concrete-mixtures, cubes sized $15 \times 15 \times 15$ cm are formed by vibration. The experimental results provided by the tests carried out with these cubes are given on Table 2.

TABLE 2

Compression strength of concrete with & without preheating the concrete-mixture

| Compound | 4 hours kgf/cm² | % | 10 hours kgf/cm² | % | 1 day kgf/cm² | % | 28 days kgf/cm² | % |
|---|---|---|---|---|---|---|---|---|
| *With concrete-mixture preheating* | | | | | | | | |
| PC-410kg/m³; W/C = 0,42; admixtureless t° = 32° C. | 43 | 100,0 | — | — | 265 | 100,0 | 485 | 100 |
| PC-410kg/m³; W/C ratio = 0,42; with admixture; t° = 36° C. | 153 | 355,8 | — | — | 340 | 128,3 | 571 | 117,7 |
| *Without concrete-mixture preheating* | | | | | | | | |
| PC-300kg/m³; W/C ratio = 0,56. admixtureless; t° = 20° C. | — | | 15 | 100,0 | 115 | 100,0 | 393 | 100,0 |
| PC-300kg/m³; W/O ratio = 0,56; with admixture t° = 20° C. | — | | 21 | 140,0 | 199 | 173,0 | 423 | 107,6 |

In order to show the effect of the concrete-mix preheating, the same Table also indicates the experimental data for a concrete having a cement: aggregates ratio of 1:6,5 with 300 kg of portland cement per 1 cubic meter, and a water/cement ratio of 0,56 without any preheating of input materials and a temperature of the mix, amounting to 20° C.

One of the batches receives the admixture with the mixing-water (the additive conpound is identical to that of the preheated concrete), whereas the second batch remains without any admixture at all. The forming of cubes is analogous to that of the preheated concrete-mix.

From the results obtained it may be seen, that the warming up of the concrete mix, leads to an additional and considerable acceleration of the hardening process, that is as soon as in a matter of 4 hrs a strength of 153 kgf/cm² may be reached. This allows the concrete-unmoulding to occur for less than 4 hrs thus ensuring a double turn over of the moulds per shift.

sand mortar is mixed, featuring the following ratios: portland cement to sand=1:3 and water to cement=0,5.

From the so obtained mixture and with the aid of a jolting apparatus, prisms sized 4×4×16 cm are formed. A part of these prisms, after their unmoulding, are air-hardened at 20° C. unless the term of testing expires and the tests are to be carried out. Another part of the same prisms, immediately after their forming and together with the moulds are submitted to a heat-treatment at 50° C. for 6 hrs being afterwards unmoulded. One half of the prisms are immediately tested, while the other half remain air-cured, being thereafter tested too.

For comparison purpose and in parallel with the admixture comprising mixtures, the same cement-sand mortar, but without admixture, are also being prepared and the experimental results thereby obtained are shown on table 3. They are clearly displaying a considerable additional acceleration of the hardening process, resulting from the heat-treatment of teh cement-sand mortar after its forming.

TABLE 3

Compression-strength of cement-sand mortar 1:3 with water/cement ratio of 0,5; with or without heat-treatment after its forming.

| Compound | 6 hours KGf/cm² | % | 8 hrs kgf/cm² | % | 16 hrs kgf/cm² | % | 28 days kgf/cm² | % |
|---|---|---|---|---|---|---|---|---|
| *Hardening in the air at 20° C.* | | | | | | | | |
| PC | — | | — | | 7,1 | 100 | 61,7 | 100 | 296,5 | 100 |
| PC with admixture | — | | — | | 20,6 | 281,7 | 135,3 | 219,3 | 367,1 | 123,8 |
| *Hardening at a 50° C. heat-treatment* | | | | | | | | |
| PC | 130,6 | 100,0 | — | — | — | — | — | — | 296,8 | 100 |
| PC with admixture | 173,9 | 133,2 | — | — | — | — | — | — | 361,9 | 121,9 |

EXAMPLE 3

For a batch of 100 weight parts of portland cement 2 weoght parts of bialiminium pentahydrooxichloride are duly weighed then solved in the mixing-water, whereupon to this silution 4 weight parts of semi-hydrate gypsum and 2 weight parts of hydrate-lime are cinsequently added. With the resulting mixture a cement-

TABLE 4

Compression strength of a cement-sand mortar 1:3 with at water cement ratio of 0,5 with and without admixture, dryly mixed with the portland cement.

| Compound | 1 day | | 3 days | | 28 days | |
|---|---|---|---|---|---|---|
| | kg$^f$/cm$^2$ | % | kg$^f$/cm$^2$ | % | kg$^f$/cm$^2$ | % |
| PC | 84,1 | 100,0 | 200,7 | 100,0 | 423,6 | 100,0 |
| PC with admixture | 187,7 | 223,2 | 362,3 | 180,5 | 527,0 | 124,4 |

EXAMPLE 4

For a batch of 100 weight parts of portland cement, 2 weight parts of bialuminium pentahydrooxichloride, 4 weight parts of smei-hydrate gypsum and 2 weight parts of hydrate-lime are being weighed and dryly mixed with cement unless a good homogenization occurs. Then, a cement-sand mortar is prepared, featuring the following ratios: portland cement: sand=1:3 and water to cement=0,5.

From this obtained mixture, occuring to the aid of a jolting table prisms sized 4×4×16 cm are formed, which, after their unmoulding are under-water hadened at 20° C.

For comparison pupose and by the same manner, a cement-sand mortar is prepared and formed but without any admixture therein, while the resulting experimental data are shown on table 4. These latter definitely indicate, that also by a dry admixture and cement blending, its hardening process is largely accelerated—together with a considerable strength increase.

TABLE 5

Compression strength of a cement-sand mortar 1:3 with water/cement ratio of 0,5 with or without admixture supplied by the mixing water

| Compound | 1 day | | 3 days | | 28 days | |
|---|---|---|---|---|---|---|
| | kg$^f$/cm$^2$ | % | kg$^f$/cm$^2$ | % | kg$^f$/cm$^2$ | % |
| PC | 88,9 | 100,0 | 238,0 | 100,0 | 411,4 | 100,0 |
| PC with admixture | 187,7 | 211,0 | 346,2 | 145,5 | 497,1 | 121,0 |

EXAMPLE 5

For a batch of 100 weight parts of portland cement, 2 weight parts of bialuminium pentahydrooxichloride are weighed, then dissolved in the mixing-water with a siccessive addition of 4 weight parts of semi-hydrate gypsum and 2 weight parts of hydrate-lime. With thus obtained mixture, further cement-sand mortar is prepared. Here again, prisms sized 4×4×16 cm are formed by the manner already described above. After their delivery from the moulds, the prisms are submitted to an under-water hardening at 20° C. unless the time of testing comes. The experimental results are shown on table 5. They firmly indicate that at suplying the admixture together with the mixing water, the hardening of the cement is considerably accelerated with a simultaneous strength-increase, which is more than doubled for the first day an after 28 days its strength, i.e. its brand, rises from Mark "350" to Mark "450".

TABLE 5

Compression strength of a cement-sand mortar 1:3 with water/cement ratio of 0,5 with or without admixture supplied by the mixing water

| Compound | 1 day | | 3 days | | 28 days | |
|---|---|---|---|---|---|---|
| | kg$^f$/cm$^2$ | % | kg$^f$/cm$^2$ | % | kg$^f$/cm$^2$ | % |
| PC | 88,9 | 100,0 | 238,0 | 100,0 | 411,4 | 100,0 |
| PC with admixture | 187,7 | 211,0 | 346,2 | 145,5 | 497,1 | 121,0 |

What we claim is:

1. A method of accelerating the hardening and increasing the strength of Portland cement, which comprises mixing 100 parts by weight of Portland cement with water with a mixture of 4–16 parts by weight, containing dialuminum pentahydroxychloride, calcium sulfate and calcium oxide in weight ratios of $Al_2O_3$:$CaSO_4$:$CaO$ = 1:3.5 to 4.3:1.3 to 1.8 and up to 2 parts by weight of an alkali metal nitrite, at a temperature up to 90° C., thereafter permitting the mixture to harden at a temperature up to 100° C.

2. A method according to claim 1, wherein the dialuminium pentahydroxychloride, calcium sulfate, calcium oxide and alkali metal nitrite are mixed dry with said Portland cement while subjecting the mixture to grinding.

3. A method according to claim 1, wherein the dialuminium pentahydroxychloride, calcium sulfate, calcium oxide and alkali metal nitrite are mixed with said water, and thereafter mixed with said Portland cement.

* * * * *